May 23, 1967   IICHI TAJIRI ETAL   3,320,797
ULTRASONIC INTERNAL FLAW DETECTING APPARATUS FOR HOT METAL
Filed Aug. 5, 1963

INVENTOR
Iichi  Tajiri
Shozo  Sekino
Yukito  Sasaki

BY Wenderoth, Lind and Ponack

ATTORNEYS

United States Patent Office 3,320,797
Patented May 23, 1967

3,320,797
ULTRASONIC INTERNAL FLAW DETECTING
APPARATUS FOR HOT METAL
Iichi Tajiri, Shozo Sekino, and Yukito Sasaki, Kitakyushu,
Japan, assignors to Yawata Iron & Steel Co., Ltd.,
Tokyo, Japan, a corporation of Japan
Filed Aug. 5, 1963, Ser. No. 300,019
Claims priority, application Japan, Aug. 13, 1962,
37/34,810
3 Claims. (Cl. 73—67.7)

This invention relates in general to an apparatus for non-destructive ultrasonic detection of flaws in a heated metal and more particularly to an ultrasonic flaw detecting device in which satisfactory transmission and penetration of a detecting ultrasonic wave are assured by the presence of an applied liquid couplant, characterized by a high affinity for the metal, between the probe and the metal being tested.

An object of this invention is to provide an improved ultrasonic non-destructive internal flaw detector which, for the purpose of flaw detection at a very high temperature, is capable of testing the metal for possible internal flaw without destroying the metal by a contact method, by virtue of the application of a couplant assuring exceptionally high acoustic coupling and an intermediate attachment, when the said metal is in a hot state having a high temperature from 150° C. up to about 1,200° C.

Another object of the present invention is to provide a novel device which provides an improved acoustic coupling at a very high temperature between the surface of the metal which is still in a hot state after being rolled and the probe of an ultrasonic internal flaw detector, by interposing a molten metallic salt or a mixture of such salts, which is often used for salt-bathing in the practice of the ordinary heat treatment of a metal, between the said surface and the intermediate attachment.

Another object of the present invention resides in providing a flaw detecting device in which the probe of the ultrasonic flaw detector, used for a non-destructive detection of the internal flaws in a hot metal, is protected against the effect of heat, and a device which provides an improved acoustic coupling between the surface of the hot metal and the said probe, by interposing a molten metallic salt or mixture thereof, which is often used for salt-bathing, and an intermediate attachment made of metal or such a non-metallic substance as quartz or the like.

Other objects and a fuller understanding of the invention may be had by referring to the following description and claims, taken in conjunction with the accompanying drawing, in which:

Figure 3:
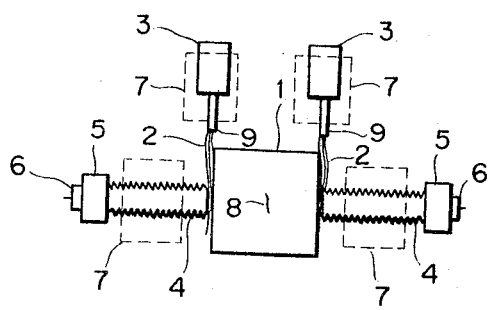
Figure 5:
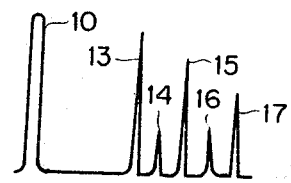
Figure 4:
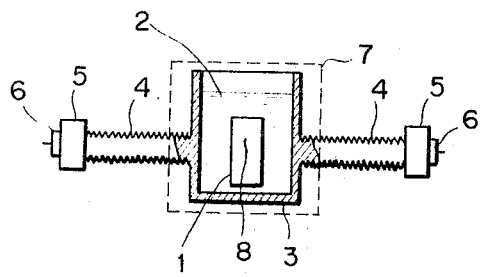

FIG. 3 and FIG. 4 are elevation views of devices comprising alternative embodiments of this invention; and FIG. 5 is an oscillographic representation of an ultrasonic internal flaw, resulting from non-destructive inspection, carried out with the testing arrangements, illustrated in FIG. 3 and FIG. 4. Conventional practice of ultrasonic internal flaw detection for a metal can not be accomplished non-destructive testing of a metal heated at a high temperature in excess of 150° C.

For successful ultrasonic internal flaw inspection of the said heated metal, a solution of several technical problems is an absolute prerequisite.

A conventional probe for ultrasonic inspection, which is capable of successfully detecting an internal flaw without destroying the object tested, is operable at a temperature up to only 100° C. because of its construction, and cannot be contacted with the surface of a highly heated metal. To eliminate this difficulty, it has so far been the customary practice to provide a suitable intermediate attachment which serves as an ultrasonic energy-transmitting medium and as a heat-protector for the probe, and is made of a material such as quartz, which will absorb the least possible energy.

When practicing a counter-measure such as described above, there must be a thin film of oil or the like for setting up a suitable acoustic coupling between the intermediate attachment and the probe, because the connection between them should be of such a construction that it can be kept nearly equal to room temperature, and the couplant must be a substance that is characterized by being liquid at the temperature of detection and having a low vapor pressure because the contact point between the intermediate attachment and the surface of the metal must be heated up to a very high temperature for successful internal flaw inspection of steel in a hot rolling line. Powerful ultrasonic energy has been applied in the process of heat treatment of steel for the improvement of mechanical properties of the steel. It has been proposed that a low-melting point metal such as lead or the like be employed as an acoustic couplant between the ultrasonic vibrator and the surface of the metal which is hot to assure a good contact between them. A substance such as a low-melting point metal, however, is readily oxidized at a high temperature and is accordingly very liable to be coated with the film of oxide, and is difficult to place in good contact with the surface of the steel to be inspected for internal flaws, thus reducing acoustic coupling performance. This means that said type of substance cannot be recommended for use as an acoustic couplant for the heated metal.

Therefore, proper precautions should be exercised so that the film of oxide, present on the surface of the metal to be tested, be thoroughly removed in advance, if a low-melting point metal such as lead, tin or the like is to be employed as a coupling medium.

In fact, ultrasonic output of a conventional ultrasonic flaw detector is, as a practical matter, too feeble to destroy the film of oxide mechanically so that it must be combined with a suitable powerful ultrasonic source such as is often employed for an ultrasonic welder to insure destruction of the oxide film. This results in a very complicated construction of the internal flaw detector. The present invention makes possible ultrasonic internal flaw detection, without the necessity for mechanical removal of the film of surface oxide on the hot metal after it has been rolled, by elimination of the above described drawback of the conventional method using an ultrasonic flaw detector, and by use of a suitable couplant as will be described later.

An interposed intermediate attachment often gives rise to various difficulties in the practice of ultrasonic internal flaw detection. Design and size of the said attachment is practically limited with respect to its sectional area in order to assure a large available cooling effect of the same, because it must act to protect the probe against the attack of heat.

In other words, if the intermediate attachment can not be designed so as to be large enough it causes serious side boundary echos, to take place therein. Therefore, in making an ultrasonic inspection by a single-probe echo method or double-probe echo method wherein the intermediate attachment having a large size is used, the side boundary echos are picked up only through the continuous medium (couplant) and, accordingly, with hardly any loss of ultrasonic energy thereof. For this reason, the said echo, or a noise, so picked up is oscillographically very serious in comparison with useful echos, penetrating through the inspected metal after being subjected to grave loss of ultrasonic energy at the point of contact between the intermediate attachment and surface of said metal, resulting in a practical impossibility of ultrasonic flaw detection because of oscillographic reproduction of only the overwhelming side boundary echo (noise) which hopelessly conceals other echos that are really useful for successful internal flaw detection. Generally, a highly acceptable acoustic coupling between the intermediate attachment and the surface of the metal to be inspected can not be obtained in a practical way because of the conditions which exist during the actual practice of internal flaw detection, and as a result, serious reflection and absorption of ultrasonic energy take place in the said coupling, thus causing the energy available to penetrate into the metal for reflection from a flaw to be substantially reduced.

If all the useful echos taking place within the metal to be inspected are to be picked up at an intensity which permits clear quantitative determination thereof on the oscillographic cathode ray tube, available amplification for the ultrasonic flaw detector must be much higher than that required for internal flaw detection for an ordinary low-temperature (cold) metal. Thus even a conventional method of internal flaw detection, conducted by a two probe method, in which the intermediate attachment is provided for individual probes, sending and receiving, gives rise to oscillographic representation (reflectogram) of the side boundary echo talking place within the sending side as an imaginary echo, picked up by electric inductance. In order to eliminate such a difficulty, resulting from the use of the said intermediate attachment, there must be a development of a novel technique of ultrasonic internal flaw detection which is free from adverse influence of the ultrasonic side boundary echo on the oscillographic representation, or which can assure reduction of the said influence sufficiently so that interpretation of the oscillographic representation is practically feasible.

When the ultrasonic flaw detector is used in a two probe method, in which separate probes are provided for ultrasonic sending and reception, the initial pulse which theoretically should not be oscillographically represented is, as any expert on non-destructive internal flaw inspection is well aware of, always noted on the oscillographic representation. This is due to electric induction between both sides, sending and receiving, and the height of the peak of the said pulse on the oscillographic representation is too variable, depending on the gain setting and characteristic error of the internal flaw detector during the flaw inspection, to be defined numerically, but it may be unobjectionable from the qualitative point of view to say that the said peak height becomes larger as the pick-up sensitivity of the detector is set higher. This tendency, described above, is true not only for the initial pulse, but also for all the false echos, picked up by the receiving probe. For this reason, to remove the interference due to the electric induction, represented by the above stated tendency (which is exaggerated where the echo-pick-up sensitivity must be set at as high a level as possible, because of extremely large loss of ultrasonic energy because of the detector construction, as is often the case with internal flaw detection of a hot metal), special care should be exercised in the design of the intermediate attachment. Sensitivity adequate for successful ultrasonic internal flaw detection of a hot metal is obtainable in the conventional internal flaw detector without any additional idea incorporated therein.

Ultrasonic frequency in excess of 2.25 mc. is not acceptable for successful internal flaw detection in practice.

The present invention provides a successful device which meets the above described requirements for the ultrasonic detection of internal flaws in a hot metal.

According to this invention, the couplant may be an ordinary bathing salt for known heat-treatment and it enables successful flaw inspection of a metal heated up to 150–500° C. The salt is a metallic salt taken from the group consisting of $KNO_3$, $KNO_2$, $NaNO_3$, $LiNO_3$, $NaCl$, $BaCl_2$, $CaCl_2$, $Na_2B_4O_7$ (sodium borate) and $KCl$ and mixtures thereof.

Several examples of the said salts are enumerated hereunder:

| Mixed salt, composed of— | Melting point, °C. |
| --- | --- |
| $KNO_3$ 25%, $KNO_2$ 30%, $NaNO_3$ 25%, $NaNO_2$ 20% (Note: Percent represents percentage by weight. This is applicable to all percentages, appearing hereafter.) | Approx. 150 |
| $NaNO_3$ 19%, $KNO_3$ 54%, $LiNO_3$ 27% | Approx. 150 |
| $NaNO_3$ 46%, $KNO_3$ 54% | Approx. 218 |
| $NaNO_2$ 45%, $NaNO_3$ 55% | Approx. 221 |
| $LiNO_3$ | 255 |
| $NaNO_2$ | 280 |
| $KNO_2$ | 297 |
| $NaNO_3$ | 311 |
| $KNO_3$ | 336 |

For inspection of a metal heated up to a temperature in excess of 500° C., preferable salts are:

| Mixed salt, composed of— | Melting point, °C. |
| --- | --- |
| $NaCl$ 20.2%, $BaCl_2$ 31.2%, $CaCl_2$ 48.6% | Approx. 453 |
| $NaCl$ 30%, $BaCl_2$ 70% | Approx. 655 |
| $Na_2B_4O_7$ (sodium borate) | 748 |
| $KCl$ | 775 |
| $CaCl_2$ | 775 |
| $NaCl$ | 803 |
| $BaCl_2$ | 963 |

The heating device may be either an electric furnace or any other known heating means, but the capacity of the heating furnace 7 should be such that it can assure the above specified heating temperature, and the intermediate attachment 4 should be designed to have a length of 40 mm. and, in order to eliminate, as much as possible, the effect of positive and imaginary side boundary echo, be provided with peripheral grooves at a pitch and a depth on the same order as the ultrasonic wave length used.

It has, however, been experimentally confirmed that the position of two intermediate attachments 4, as combined with the probe and erected symmetrically to each other as shown, can remove the possibility of influence by the false boundary echo without the peripheral grooves.

The angle of the intermediate attachment need not be specifically defined and need only be such that the crossing point of the longitudinal center lines of two intermediate attachments falls exactly on the bottom (opposite side) of the metal to be inspected, in order to assure the greatest height of the oscillographic peak of the picked up echo for a metal piece of any thickness.

Figure 2:
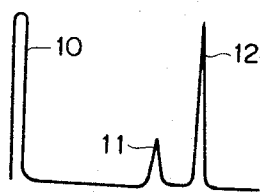
FIG. 2 is a representation of the oscillographic pattern for ultrasonic internal flaw detection obtained by means of the device shown in FIG. 1.

As a recommended couplant, a mixed salt, composed of 20.2% $NaCl$, 31.2% $BaCl_2$ and 48.6% $CaCl_2$, is employed, which is characterized by a good contact with the surface of the metal after the metal has been hot-rolled. Such couplant is previously melted down in the tank 3, which, for this purpose, is placed in the heating furnace 7, and is then supplied, in the form of hot drops, down to the surface of the metal 1 through the bottom pipe 9. FIG. 2 illustrates an example of the oscillographic pattern, produced by the impulse reflection type internal flaw detector, operated in an arrangement as described above. The illustrated representation contains, as is noted, an initial impulse 10 a flaw echo 11, reflected from the internal defect 8, and a bottom echo 12 from the bottom surface of the inspected metal, in the described order from left to right. In case where the inspected metal 1 is free from internal flaws, the intense positive side boundary echo, occurring in the intermediate attachment 4, always comes after the bottom echo 12; this means that there is no possibility of confusion of the bottom echo with the flaw echo 11 in interpreting representation, and makes the peak height of the imaginary side boundary echo, generated by electric induction within the intermediate attachment for the sending probe, and resulting from adequate sectional configuration of the said attachment, practically negligible.

FIG. 3 and FIG. 4 represent two other embodiments of the arrangement of the ultrasonic internal flaw detector, according to this invention, which can be operated as a two probe system; FIG. 3 shows an arrangement searching for a flaw from both sides of the metal to be inspected, and FIG. 4 illustrates another arrangement by which ultrasonic energy is applied to the metal 1 through the couplant 2, which is in the form of a thin film on both sides of the metal to be tested when the contact method is used which is in the form of a layer with a given thickness on both sides of the metal to be tested when the non-contact method is used.

FIG. 5 illustrates an oscillographic representation of the impulse reflection (echo) type internal flaw detector, operated according to the two methods, contact and non-contact. As is noted therein, the initial impulse 10, the penetration impulse 13, and flaw echos 14 and 16 and bottom echos 15 and 17 are seen in the order described from left to right.

Figure 1:
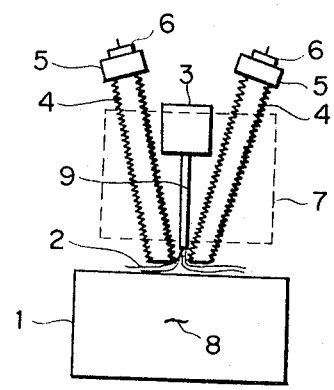
FIG. 1 is an elevation view of a flaw detecting device comprising one embodiment of this invention.

In this oscillographic representation, all intense positive side boundary echos, generated within the intermediate attachment 4, always appear after the penetration impulse 13, but when an estimate of the magnitude of the flaw 8 is to be made according to only the penetrating wave 13, the effect of the side boundary echo can be neglected, and the intermediate attachment 4 can be set up with the same limitation on the design as for the arrangement illustrated in FIG. 1, taking special caution with respect to the imaginary side boundary echo.

On the other hand, to estimate the said magnitude from the flaw echos 14 and 16 as well as bottom echos 15 and 17, shown in FIG. 5, the intermediate attachment 4 should have peripheral grooves with a pitch and a depth, on the same order as the length of ultrasonic wave being used, and should have a sectional area, much larger than that for the arrangement shown in FIG. 1, in order to avoid the superposition of the side boundary echo on the flaw and bottom echos. For the arrangement illustrated in FIG. 3 it is necessary that the intermediate attachment 4 be so designed with respect to length that the echo taking place at the boundary between the said attachment 4 and the metal 1 to be tested can not be superposed on the echos superposed on the echos which are essential for flaw detection. For the arrangement shown in FIG. 4, additional design consideration should be given to the thickness of the couplant 2 so that the echo occuring within the layer of the couplant cannot be superposed on the flaw echo or the bottom echo.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

1. An improved ultrasonic internal flaw detecting apparatus for use in non-destructive testing of a piece of metal heated to very high temperatures, comprising a transmitting probe, a receiving probe, an intermediate signal conveying bar for each probe with the respective probes each being attached to one end of a bar, the bars being symmetrically positioned with respect to a position occupied by the piece of metal to be tested, a melting tank, conduit means from said melting tank to the positions of the other ends of the signal transmitting bars where they are adjacent the position of the piece of metal to be tested, a molten metallic coupling salt in said tank and flowing past the said other ends of said signal transmitting bars for coupling the bars to the piece of metal to be tested, said metallic salt being a salt taken from the group consisting of $KNO_3$, $KNO_2$, $NaNO_2$, $NaNO_3$, $LiNO_3$, $NaCl$, $BaCl_2$, $CaCl_2$, $Na_2B_4O_7$ (sodium borate) and $KCl$ and mixtures thereof, said metallic salt having a melting point of from 150° C. to 1,000° C., being difficult to evaporate, and having high wettability properties, and heating means for heating said melting tank and the other ends of the signal transmitting bars and the molten metallic couplant salt therearound.

2. A flaw detecting device as claimed in claim 1 in which said metallic salt is a mixture of 20.2% $NaCl$, 31.2% $BaCl_2$ and 48.6% $CaCl_2$.

3. A flaw detecting device as claimed in claim 1 in which the said signal transmitting bars are aligned and said other ends of said signal transmitting bars are opposed to and spaced from each other.

References Cited by the Examiner

UNITED STATES PATENTS

| | | | |
|---|---|---|---|
| 2,697,936 | 12/1954 | Farrow | 73—67.9 |
| 2,799,157 | 7/1957 | Pohlman | 73—67.7 |
| 3,121,325 | 2/1964 | Rankin et al. | 73—67.7 |

OTHER REFERENCES

Bullens: Steel and Its Heat Treatment, vol. II, 5th edition, John Wiley and Sons, Inc., New York. (Copy in Group 110.)

RICHARD C. QUEISSER, *Primary Examiner.*

L. FRANKLIN, J. P. BEAUCHAMP,

*Assistant Examiners.*